United States Patent [19]

Calundann

[11] 4,395,513

[45] Jul. 26, 1983

[54] HIGH PERFORMANCE THERMALLY STABLE POLY(6-OXY-2-NAPHTHOATE)

[75] Inventor: Gordon W. Calundann, Plainfield, N.J.

[73] Assignee: Celanese Corporation, New York, N.Y.

[21] Appl. No.: 366,679

[22] Filed: Apr. 8, 1982

[51] Int. Cl.$^3$ ............................................. C08G 63/06
[52] U.S. Cl. ................................... 524/599; 524/601; 524/602; 524/605; 528/183; 528/190; 528/206; 528/208; 528/209; 528/271; 528/288; 528/344
[58] Field of Search ............... 528/190, 206, 183, 271, 528/288, 344, 208, 209; 524/599, 601, 602, 605

[56] References Cited

U.S. PATENT DOCUMENTS

| | | | |
|---|---|---|---|
| 4,256,624 | 3/1981 | Calundann | 528/190 |
| 4,318,842 | 3/1982 | East et al. | 528/190 |
| 4,330,457 | 3/1982 | East et al. | 528/190 |
| 4,337,190 | 6/1982 | Calundann | 528/190 |

*Primary Examiner*—Lester L. Lee
*Attorney, Agent, or Firm*—Burns, Doane, Swecker & Mathis

[57] ABSTRACT

An improved high performance thermally stable polymer is provided. Such polymer is composed primarily of recurring 6-oxy-2-naphthoyl moieties and is preferably a homopolymer of 6-oxy-2-naphthoyl moieties, i.e. poly(6-oxy-2-naphthoate). It is particularly suited for use in the formation of plasma spray coatings and compression or impact molded articles, and has been found to offer a thermal stability which is superior to that of poly(4-oxybenzoate). Small amounts (as described) of other ester-forming moieties and/or amide-forming moieties optionally may also be present.

11 Claims, No Drawings

HIGH PERFORMANCE THERMALLY STABLE POLY(6-OXY-2-NAPHTHOATE)

BACKGROUND OF THE INVENTION

Wholly aromatic polyester resins have long been known. For instance, 4-hydroxybenzoic acid homopolymer and copolymers have been provided in the past and are commercially available. Such polymers commonly are crystalline in nature, relatively high melting or possess a decomposition temperature which is below the melting point, and when molten frequently exhibit an isotropic melt phase. Molding techniques such as compression molding or sintering may be utilized with such materials. Representative publications which discuss these wholly aromatic polyesters include: (a) *Polyesters of Hydroxybenzoic Acids*, by Russell Gilkey and John R. Caldwell, J. of Applied Polymer Sci., Vol. II, Pages 198 to 202 (1959), (b) *Polyarylates (Polyesters From Aromatic Dicarboxylic Acids and Bisphenols)*, by G. Bier, Polymer, Vol. 15, Pages 527 to 535 (August 1974), (c) *Aromatic Polyester Plastics,* by S. G. Cottis, Modern Plastics, Pages 62 to 63 (July 1975), and (d) *Poly(p-Oxybenzoyl Systems): Homopolymer for Coatings: Copolymers for Compression and Injection Molding*, by Roger S. Storm and Steve G. Cottis, Coatings Plast. Preprint, Vol. 34, No. 1, Pages 194 to 197 (April 1974). See also, U.S. Pat. Nos. 3,039,994; 3,169,121; 3,321,437; 3,553,167; 3,637,595; 3,651,014; 3,662,052; 3,668,300; 3,723,388; 3,759,870; 3,767,621; 3,773,858; 3,787,370; 3,790,528; 3,829,406; 3,857,814; 3,884,876; 3,890,256; 3,974,250; and 3,975,487. U.K. patent application No. 2,058,102A which was published on Apr. 8, 1981, discusses the use in ovenware of a broadly defined class of polyesters which may include oxynaphthoyl moieties of unspecified symmetry.

Wholly aromatic polyesters additionally have been disclosed which incorporate 6-oxy-2-naphthoyl moieties and which are stated to exhibit an optically anisotropic melt phase. See, for instance, commonly assigned U.S. Pat. Nos. 4,161,470; 4,219,461; 4,256,624; 4,279,803, 4,299,756; and 4,318,841; and commonly assigned U.S. Ser. No. 169,014, filed July 15, 1980 (now U.S. Pat. No. 4,337,190). Commonly assigned U.S. Ser. Nos. 214,557, filed Dec. 9, 1980 (now U.S. Pat. No. 4,330,457); 251,625, filed Apr. 6, 1981 (now U.S. Pat. No. 4,351,917); and 251,629, filed April 6, 1981 (now U.S. Pat. No. 4,351,918), disclose poly(ester-amides) which incorporate 6-oxy-2-naphthoyl moieties. Commonly assigned U.S. Ser. No. 319,024, filed Nov. 6, 1981, discloses a poly(ester-carbonate) which incorporates 6-oxy-2-naphthoyl moieties.

It is an object of the present invention to provide an improved thermally stable polymer.

It is an object of the present invention to provide an improved thermally stable polymer which is particularly suited for use in the formation of plasma spray coatings, compression molded articles, and impact molded articles.

It is an object of the present invention to provide a novel polymer which exhibits good mechanical strength at elevated temperatures, good resistance to flow and creep at elevated temperatures, good wear resistance at elevated temperatures, and good resistance to flammability.

It is an object of the present invention to provide a novel polymer which has been found to exhibit a thermal stability which is superior to that of poly(4-oxybenzoate) formed under the same conditions.

It is an object of the present invention to provide a novel polymer which has been found to exhibit a higher level of crystallinity than poly(4-oxybenzoate) formed under the same conditions.

It is a further object of the present invention to provide a novel polymer which has been found to exhibit a crystal/crystal transition in the solid state at a higher temperature than poly(4-oxybenzoate) formed under the same conditions.

These and other objects, as well as the scope, nature, and utilization of the claimed invention will be apparent to those skilled in the art from the following detailed description and appended claims.

SUMMARY OF THE INVENTION

A high performance thermally stable polymer is provided consisting of recurring 6-oxy-2-naphthoyl moieties and 0 to approximately 3 mole percent of other ester-forming and/or amide-forming moieties which include at least one aromatic ring. In a preferred embodiment the polymer consists solely of recurring 6-oxy-2-naphthoyl moieties, i.e. it is poly(6-oxy-2-naphthoate).

DESCRIPTION OF PREFERRED EMBODIMENTS

The high performance thermally stable polymer of the present invention consists of recurring 6-oxy-2-naphthoyl moieties of the formula:

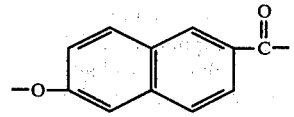

and 0 to approximately 3 mole percent of other ester-forming and/or amide-forming moieties which include at least one aromatic ring.

As will be apparent to those skilled in the art, the 6-oxy-2-naphthoyl moiety can be derived from 6-hydroxy-2-naphthoic acid, and the derivatives thereof. A convenient laboratory preparation for forming 6-hydroxy-2-naphthoic acid is described in Berichte, Vol. 58, 2835-45 (1925) by K. Fries and K. Schimmelschmidt which is herein incorporated by reference. U.S. Pat. No. 1,593,816 is concerned with a process for synthesizing 6-hydroxy-2-naphthoic acid by reacting carbon dioxide with the potassium salt of beta-naphthol. See also the synthesis routes discussed in U.S. Pat. Nos. 4,239,913 and 4,287,357.

In a preferred embodiment the polymer is a homopolymer which consists solely of recurring 6-oxy-2-naphthoyl moieties, and may be named poly(6-oxy-2-naphthoate).

In the embodiment of the present invention wherein other ester-forming moieties are present in a concentration of up to approximately 3 mole percent such moieties may be derived from a comonomer source selected from the group consisting of aromatic diols and aromatic diacids, aromatic hydroxyacids other than 6-hydroxy-2-naphthoic acid, and mixtures of the foregoing. It is preferred but not essential that such other ester-forming moieties have symmetrically disposed bonds in the main polymer chain. Preferred symmetrical moieties which are derived from an aromatic diol are derived from hydroquinone, 2,6-dihydroxynaphthalene, methylhydroquinone, chlorohydroquinone, bromohydroquinone, etc. Preferred symmetrical moieties which are derived from an aromatic diacid are derived from terephthalic acid, 2,6-naphthalene dicarboxylic acid, etc. Preferred symmetrical moieties derived from aromatic hydroxyacids are derived from p-hydroxybenzoic acid. Representative non-symmetrical moieties can be derived from resorcinol, isophthalic acid, and m-hydroxybenzoic acid.

In the embodiment of the present invention wherein amide-forming moieties are present in a concentration of up to approximately 3 mole percent such moieties possess the structural formula —Y—Ar—Z— where Ar is a divalent radical comprising at least one aromatic ring, Y is O,

NH, or NR, and Z is NH or NR, where R is a alkyl group of 1 to 6 carbon atoms or an aryl group. R is preferably a straight-chain alkyl group of 1 to 6 carbon atoms and is more preferably a methyl group. Examples of monomers from which the amide-forming moieties are derived include p-aminophenol, p-N-methylaminophenol, p-phenylenediamine, N-methyl-p-phenylenediamine, N,N'-dimethyl-p-phenylenediamine, m-aminophenol, 3-methyl-4-aminophenol, 2-chloro-4-aminophenol, 4-amino-1-naphthol, 4-amino-4'-hydroxydiphenyl, 4-amino-4'-hydroxydiphenyl ether, 4-amino-4'-hydroxydiphenyl methane, 4-amino-4'-hydroxydiphenyl ethane, 4-amino-4'-hydroxydiphenyl sulfone, 4-amino-4'-hydroxydiphenyl sulfide, 4,4'-diaminophenyl sulfide (thiodianiline), 4,4'-diaminodiphenyl sulfone, 2,5-diaminotoluene, 4,4'-ethylenedianiline, 4,4'-diaminodiphenoxyethane p-aminobenzoic acid, m-aminobenzoic acid, and p-(N-methylamino)benzoic acid. It is preferred but not essential that such amide-forming moieties have symmetrically disposed bonds in the main polymer chain.

The polymer of the present invention commonly exhibits

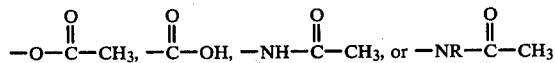

end groups depending upon the synthesis route selected. As will be apparent to those skilled in the art, the end groups optionally may be capped, e.g., acidic end groups may be capped with a variety of alcohols, and hydroxyl end groups may be capped with avariety of organic acids. For instance, end capping units such as phenyl ester

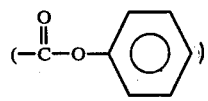

and methylester

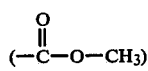

optionally may be included at the end of the polymer chains.

The high performance thermally stable polymer of the present invention exhibits great solvent resistance and tends to be insoluble in all known solvents for polyesters. It commonly exhibits a weight average molecular weight of at least 8,000, and preferably about 10,000 to 50,000, e.g. about 20,000 to 25,000. The molecular weight may be determined by standard techniques commonly employed with insoluble polymers, e.g. by infrared end group analysis, etc.

The polymer of the present invention may be formed by a variety of ester-forming (and optionally also amide-forming) techniques whereby organic monomer compounds possessing functional groups which upon condensation form the requisite recurring moieties are reacted. During the polyester-forming reaction the functional groups of the organic monomer compounds may be carboxylic acid groups, hydroxy groups, ester groups, acid halides, etc. For instance, the organic monomer compound or compounds may be reacted in the absence of a heat exchange fluid. They accordingly may be heated initially with stirring to form a monomer melt with the polymer product separating as a particulate solid as polymerization takes place. A vacuum may be applied to facilitate removal of volatiles formed during the condensation (e.g. acetic acid or water). More specifically, in such preferred technique, the organic monomer reactants may be initially provided in a modified form whereby the usual hydroxyl groups of these monomers are esterfied (i.e. they are provided as acyl esters). For instance, lower acyl esters of 6-hydroxy-2-naphthoic acid wherein the hydroxy group is esterified may be provided. The lower acyl groups preferably have from 2 to about 4 carbon atoms. Preferably the acetate esters of the monomer or monomers are provided. Accordingly, particularly preferred reactant is 6-acetoxy-2-naphthoic acid. If minor quantities of other reactants which provide oxy-units within the resulting polymer optionally are provided, these too are preferably provided as the corresponding lower acyl esters. The relative quantities of organic monomer reactants are provided in the reaction zone so that the potential dicarboxy units and dioxy units, if present, are substantially equal.

In accordance with a slurry polymerization technique, the 6-acetoxy-2-naphthoic acid and any other monomer or monomers (as described) may be provided in an inert heat exchange medium. As the polymer forms, it is insoluble in the inert heat exchange medium and assumes the configuration of a fine powder. The heat exchange medium preferably possesses a boiling point in excess of the maximum polymerization temperature utilized. Those inert heat exchange media having boiling ranges of about 350° to 430° C. are particularly preferred. Representative heat exchange media include the terphenyls; a eutectic mixture of 73.5 percent diphenyl oxide and 26.5 percent diphenyl, commercially available from the Dow Chemical Co. under the trademark Dowtherm A; mixtures of polychlorinated polyphenyls such as chlorinated biphenyls typified by those commercially available from the Monsanto Co. under the trademark Therminol FR; terphenyls and mixtures thereof such as those composed of meta and para isomers commercially available from the Monsanto Co. under the trademark Therminol (e.g. Therminol 88, 77, or 66); diphenylsulfone; other arylsulfones, such as substituted diphenylsulfones (e.g. ditolyl sulfone), etc. The relative quantity (weight:weight) of inert heat exchange medium to reactants in the reaction zone typically is in the ratio of heat exchange medium to total reactants of about 0.2:1 to 4:1.

The slurry polymerization reaction may be carried out on a batch, continuous, or semicontinuous basis. Typical polymerization reactions commonly are carried out at a temperature of at least about 200° C. up to a temperature below the decomposition temperature of the resulting polymer. In a particularly preferred embodiment of the process, the temperature of the slurry is increased as the polymerization reaction progresses. A gradual or stepwise temperature increase during the polymerization has been found to insure the formation of a superior product. The maximum polymerization temperature ultimately achieved usually does not exceed about 360° C. The polymerization reaction preferably is carried out with agitation at atmospheric pressure under an inert gas blanket with the condensation reaction by-products (e.g., acetic acid) being continuously removed from the reaction zone. Superatmospheric or subatmospheric pressures optionally can be utilized usually without commensurate advantage. Typical reaction times commonly range from about 2 to 30 hours, with the lesser reaction times being possible when the reaction is catalyzed.

Representative catalysts for use in the process include dialkyl tin oxide (e.g. dibutyl tin oxide), diaryl tin oxide, titanium dioxide, alkoxy titanium silicates, titanium alkoxides, alkali and alkaline earth metal salts of lower carboxylic acids (e.g. sodium acetate, magnesium acetate, etc.), the gaseous acid catalysts such as gaseous Lewis acids, hydrogen halides (e.g. HCl), etc. The quantity of catalyst utilized typically is about 0.001 to 1 percent by weight based upon the total monomer weight, and most commonly about 0.01 to 0.2 percent by weight.

At the conclusion of the polymerization reaction the solid particulate polymer is recovered by any convenient technique. For instance, the solid particulate polymer conveniently may be separated from the inert heat exchange medium (preferably following cooling) by decantation, centrifugation, or filtration. It is then washed, and is dried. During the washing, residual heat exchange medium adhering to the product may be removed by acetone, alcohols, lower hydrocarbons, methylene chloride, chloroform, benzene, toluene, etc., or any other relatively volatile solvent in which the heat exchange medium is soluble. The resulting particles of polymer may be solid state polymerized to a higher molecular weight level.

The resulting polymer of the present invention has been found to exhibit high performance properties and to possess a significant level of thermal stability. When compared to poly(4-oxybenzoate) formed under the same conditions, the polymer of the present invention has been found to possess a thermal stability which is superior to poly(4-oxybenzoate). Such enhanced thermal stability can be confirmed by standard thermogravimetric analysis in both isothermal and dynamic modes of operation under a nitrogen atmosphere in which polymer weight changes at elevated temperatures are accurately measured. When exposed to air at highly elevated temperatures, the polymer of the present invention will darken to a greater degree than poly(4-oxybenzoate), but such darkening is deemed to be largely a cosmetic consideration which will be of no real significance in most end use applications.

The enhanced stability of the polymer of the present invention when compared to poly(4-oxybenzoate) also can be confirmed by differential scanning calorimetry and X-ray diffraction analysis at elevated temperatures. More specifically, it has been found that the polymer of the present invention undergoes a crystal/crystal transition in the solid state at a temperature approximately 50° C. higher than that of poly(4-oxybenzoate) formed under the same conditions. Also, the polymer of the present invention has been found to exhibit a higher level of crystallinity than poly(4-oxybenzoate) formed under the same conditions.

The polymer of the present invention can be used to advantage in those applications where poly(4-oxybenzoate) heretofore has been utilized. The polymer is particularly suited for the formation of plasma spray coatings, or for the formation of thermally stable high performance three-dimensional articles by compression or impact molding. Representative compression molded articles can be formed by compressing finely ground particles of the polymer at approximately 10,000 to 30,000 psi while at approximately 340° to 440° C. Various other sintering techniques also can be used to form high performance articles from the polymer of the present invention.

Fillers and/or reinforcing agents optionally may be blended with the polymer of the present invention. Such fillers and/or reinforcing agents may be included in a total concentration of about 1 to about 60 percent by weight of the resulting molding compound. Representative fibers which may serve as reinforcing media include glass fibers, asbestos, graphitic carbon fibers, amorphous carbon fibers, synthetic polymeric fibers, aluminum fibers, aluminum silicate fibers, oxide of aluminum fibers, titanium fibers, magnesium fibers, rock wool fibers, steel fibers, tungsten fibers, cotton wool, and wood cellulose fibers, etc. If desired, the fibrous reinforcement may be preliminarily treated to improve its adhesion ability to the polymer which ultimately serves as a continuous matrix phase. Representative filler materials include calcium silicate, silica, clays, talc, mica, polytetrafluoroethylene, graphite, alumina trihydrate, sodium aluminum carbonate, barium ferrite, etc. Colorants optionally may be included. The polymer of the present invention advantageously may be alloyed or blended with polytetrafluoroethylene (or other similar polymers) to form a material which is particularly suited for use in the formation of long wearing bearings, packing seals, "O" ring seals, compressor ring seals, spring-loaded seals, piston rings, etc. It may also be combined with aluminum or bronze particles to form a highly abrasion resistant coating.

The polymer of the present invention also is well suited for use in the formation of electrical/electronic components which must well withstand elevated temperatures.

The following examples are presented as specific illustrations of the claimed invention. It should be understood, however, that the invention is not limited to the specific details set forth in the examples.

EXAMPLES I

To a heated 2000 ml. flask equipped with a stirrer, argon inlet tube, and heated distillation head connected to a condenser were added the following:

(a) 350 grams of 6-acetoxy-2-naphthoic acid, and (b) 1000 grams terphenyl mixture heat exchange medium available from the Monsanto Co. under the trademark Therminol 66.

The heat exchange medium was first added to the flask, and was followed by the 6-acetoxy-2-naphthoic acid with vigorous stirring. The flask was purged with argon prior to the addition of the above to the flask, during the time the above were being added to the flask, and during the polymerization reaction.

While stirring continued, the contents of the flask while largely in slurry form were raised to 250° C. and were maintained at that temperature for approximately 1 hour, were raised to 280° C. and were maintained at that temperature for approximately 1 hour, were raised to 300° C. and were maintained at that temperature for approximately 1 hour, were raised to 320° C. and were maintained at that temperature for approximately 1 hour, were raised to 340° C. and were maintained at that temperature for approximately 2 hours, and were raised to 360° C. and were maintained at that temperature for approximately 2 hours. During the course of the polymerization reaction the acetic acid by-product was collected by distillation. At the conclusion of the polymerization the polymer product, i.e. poly(6-oxy-2-naphthoate), was present as a particulate solid. This solid was removed from the heat exchange medium by filtration, and was washed with acetone to remove adhering heat exchange medium. The product was next ground to a more finely divided form which was suitable for use in plasma spraying applications, and in the formation of high performance thermally stable three-dimensional articles by compression or impact molding.

EXAMPLE II

The same poly(6-oxy-2-naphthoate) product formed in Example I was prepared in the absence of heat exchange medium.

To a heated 300 ml. flask equipped with a stirrer, argon inlet tube, and heated distillation head was added 6-acetoxy-2-naphthoic acid. The flask was purged with argon prior to the addition of the monomer, during the time the monomer was added, and during the polymerization reaction.

While stirring continued the contents of the flask were raised from room temperature to 250° C. over a period of approximately 45 minutes, were maintained at 250° C. for approximately two hours, were raised from 250° C. to 320° C. over a period of approximately 20 minutes, and were subjected to a vacuum of 0.14 mm. Hg. for approximately one-half hour at 350° C. During the course of the polymerization reaction the acetic acid by-product was collected by distillation. At the conclusion of the polymerization the polymer product was present as a particulate solid which was kept somewhat divided by the action of the stirrer. This product was washed with acetone, and was ground to a more finely divided form which was suitable for use in plasma spraying applications, and in the formation of high performance shaped articles by compression or impact molding.

When the product was analyzed by standard differential scanning calorimetry and X-ray diffraction techniques it was found to exhibit a crystal/crystal transition in the solid state at 390° C. When poly(4-oxybenzoate) was formed in accordance with the same procedure and was subjected to the same analyses, it was found to exhibit a crystal/crystal transition in the solid state at 340° C.

Although the invention has been described with preferred embodiments it is to be understood that variations and modifications may be employed without departing from the concept of the invention as defined in the following claims.

I claim:

1. A high performance thermally stable polymer consisting of recurring 6-oxy-2-naphthoyl moieties and 0 to approximately 3 mole percent of other ester-forming and/or amide-forming moieties which include at least one aromatic ring.

2. A high performance thermally stable polymer according to claim 1 wherein said other ester-forming moieties are derived from a comonomer source selected from the group consisting of aromatic diols and aromatic diacids, aromatic hydroxyacids other than 6-hydroxy-2-naphthoic acid, and mixtures of the foregoing.

3. A high performance thermally stable polymer according to claim 1 wherein said amide-forming moieties are of the structure —Y—Ar—Z— where Ar is a divalent radical comprising at least one aromatic ring, Y is O,

NH or NR, and Z is NH or NR, where R is an alkyl group of 1 to 6 carbon atoms or an aryl group.

4. A high performance thermally stable polymer according to claim 1 wherein said other ester-forming and/or amide-forming moieties are symmetrically disposed.

5. A compression molded article comprising the high performance thermally stable polymer of claim 1.

6. An impact molded article comprising the high performance thermally stable polymer of claim 1.

7. A molding compound comprising the high performance thermally stable polymer of claim 1 which incorporates approximately 1 to 60 percent by weight of a filler and/or reinforcing agent.

8. A high performance thermally stable polymer consisting of recurring 6-oxy-2-naphthoyl moieties.

9. A compression molded article comprising the high performance thermally stable polymer of claim 8.

10. An impact molded article comprising the high performance thermally stable polymer of claim 8.

11. A molding compound comprising the high performance thermally stable polymer of claim 8 which incorporates approximately 1 to 60 percent by weight of a filler and/or reinforcing agent.

* * * * *